(12) United States Patent
Nigoghosian et al.

(10) Patent No.: US 8,151,024 B2
(45) Date of Patent: *Apr. 3, 2012

(54) RECONFIGURABLE VIRTUAL BACKPLANE SYSTEMS AND METHODS

(75) Inventors: Bedros Nigoghosian, Phoenix, AZ (US); Mitch Fletcher, Glendale, AZ (US); John Thompson, Phoenix, AZ (US); James Alexander Ross, Phoenix, AZ (US); Brian Cornelius, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/473,830

(22) Filed: May 28, 2009

(65) Prior Publication Data

US 2010/0306435 A1  Dec. 2, 2010

(51) Int. Cl.
*G06F 13/00* (2006.01)
*G06F 11/00* (2006.01)

(52) U.S. Cl. ............................ 710/104; 714/10; 370/218

(58) Field of Classification Search .................. 710/104; 714/10; 370/218
See application file for complete search history.

(56) References Cited

U.S. PATENT DOCUMENTS

| | | | |
|---|---|---|---|
| 4,658,359 A | 4/1987 | Palatucci et al. | |
| 4,799,159 A * | 1/1989 | Davidson et al. | ............... 701/14 |
| 5,152,482 A | 10/1992 | Perkins et al. | |
| 5,271,582 A | 12/1993 | Perkins et al. | |
| 5,544,329 A * | 8/1996 | Engel et al. | ....................... 710/6 |
| 6,073,251 A | 6/2000 | Jewett et al. | |
| 6,112,140 A | 8/2000 | Hayes et al. | |
| 6,373,837 B1 * | 4/2002 | Kleyman et al. | ............... 370/352 |
| 6,499,073 B1 | 12/2002 | Wallach et al. | |
| 6,681,282 B1 | 1/2004 | Golden et al. | |
| 6,742,069 B2 | 5/2004 | Papa et al. | |
| 6,922,625 B2 | 7/2005 | Weir et al. | |
| 6,973,517 B1 | 12/2005 | Golden et al. | |
| 7,002,961 B1 * | 2/2006 | Lane et al. | .................. 370/395.1 |
| 7,020,708 B2 * | 3/2006 | Nelson et al. | .................. 709/230 |
| 7,111,100 B2 | 9/2006 | Ellerbrock | |
| 7,142,953 B2 | 11/2006 | Marshall et al. | |
| 7,174,402 B2 | 2/2007 | Ellerbrock et al. | |
| 7,191,406 B1 | 3/2007 | Barber et al. | |
| 7,263,570 B2 | 8/2007 | Papa et al. | |
| 7,412,621 B2 * | 8/2008 | Choi | ............................... 714/10 |
| 7,421,526 B2 * | 9/2008 | Fletcher et al. | ............... 710/104 |
| 7,434,767 B2 | 10/2008 | Smith et al. | |
| 7,437,494 B2 | 10/2008 | Ellerbrock | |

(Continued)

*Primary Examiner* — Paul R Myers
*Assistant Examiner* — Christopher a Daley
(74) *Attorney, Agent, or Firm* — Ingrassia Fisher & Lorenz, P.C.

(57) ABSTRACT

Reconfigurable virtual backplane systems and methods are provided. One virtual backplane system includes a bus, and first and second line cards coupled to the bus. Each line card includes a processor including a memory storing an array of configuration tables. Each configuration table stores a listing of processes to be transmitted to or received from the communication bus, wherein a first configuration table is selected from the first line card upon the occurrence of a first event and a second configuration table is selected from the second line card upon the occurrence of a second event. One method includes connecting first and second buses in first and second systems, respectively, to form a bus for a new system. The method further includes detecting the connection of the first and second buses, and reconfiguring the first and second systems to operate as the new system in response to detecting the connection.

15 Claims, 6 Drawing Sheets

U.S. PATENT DOCUMENTS

| | | |
|---|---|---|
| 7,586,915 B1 * | 9/2009 | Indiresan et al. ............. 370/392 |
| 7,716,386 B1 * | 5/2010 | Vasquez et al. ................ 710/19 |
| 2006/0109842 A1 | 5/2006 | Thiele et al. |
| 2007/0040067 A1 | 2/2007 | D'Ausilio et al. |
| 2007/0067074 A1 | 3/2007 | Lykken et al. |
| 2008/0174472 A1 | 7/2008 | Stone et al. |
| 2009/0080428 A1 * | 3/2009 | Witkowski et al. ........... 370/392 |
| 2009/0251867 A1 * | 10/2009 | Sharma et al. ................ 361/737 |
| 2010/0287280 A1 * | 11/2010 | Sivan ............................ 709/226 |
| 2010/0299366 A1 * | 11/2010 | Stienhans et al. ............. 707/803 |

\* cited by examiner

RECONFIGURABLE VIRTUAL BACKPLANE SYSTEMS AND METHODS

FIELD OF THE INVENTION

The present invention generally relates to the field of computer platform control systems used in, for example, spacecraft, aircraft, habitat, and robotic systems, and more particularly relates to reconfigurable virtual backplane systems and methods.

BACKGROUND OF THE INVENTION

Aircraft and spacecraft control systems are responsible for controlling various systems in an aircraft, such as "fly by wire" guidance and navigation systems, aircraft lighting systems, aircraft environmental control systems, aircraft flight control systems, and aircraft flight management systems. Over time, different types of vehicle control systems have been proposed to provide control functionality while minimizing size, weight, and cost.

One type of control system is a federated system, which provides a dedicated box, typically referred to as a line replaceable unit (LRU), for each control function. For example, in a federated system, a separate LRU is provided for the autopilot system, the navigational system, and the like. Drawbacks to federated systems may include excessive weight, large size, and high cost.

To overcome some of these drawbacks, integrated LRU systems that combine several systems into a single LRU have been used. By consolidating several systems into a single LRU, savings in size, weight and cost can be achieved. However, when several systems are integrated into a single LRU, failure of a single system requires replacement of the entire LRU.

A more recent approach is the integrated modular avionic (IMA) control system. In an IMA system, cabinets containing one or more circuit cards replace the LRUs. A single circuit card or collection of circuit cards contains the electronics necessary to provide a function such as navigation or flight control. If a failure occurs, individual circuit cards are replaceable. In this approach, because of the integration at the cabinet level, it is difficult to create a system that implements functions using multiple cabinets.

To overcome some of these drawbacks, yet another approach utilizing a virtual backplane has been suggested. In a virtual backplane system, the actual location of an element that provides some function is unimportant since data needed by each element is placed on to a common communication bus at a regular predetermined rate. Previously, at the cabinet level, all elements could share data since they were all coupled to the same backplane. However, data exchange between cabinets was limited to typically some element needing to request data in order to receive the data. In the virtual backplane system, each of the elements in each of the cabinets sends and receives information according to a predetermined sequence stored in memory. In this way, an element may be located in any cabinet and behave as if interacting elements were in the same cabinet.

The most recent approach to the virtual backplane system utilizes a fixed schedule of activity on the bus. In this case, the activity that occurs on the backplane is pre-determined prior to system use and does not change during the operation of the computer platform system. The drawback of this system approach is that a single circuit card or collection of circuit cards or a new function within existing cards cannot be added to the architecture while the system is in operation.

BRIEF SUMMARY OF THE INVENTION

Various embodiments provide reconfigurable virtual backplane systems. One reconfigurable virtual backplane system comprises a communication bus and first and second line cards coupled to the communication bus. The first line card includes a first processor comprising a first system memory, the first system memory storing a first array of configuration tables. Each configuration table in the first array stores a listing of processes to be transmitted to or received from the communication bus, wherein a first configuration table is selected from the first array of configuration tables upon the occurrence of a first predefined event. The second line card includes a second processor comprising a second system memory, the second system memory storing a second array of configuration tables. Each configuration table in the second array stores a listing of processes to be transmitted to or received from the communication bus, wherein a second configuration table is selected from the second array of configuration tables upon the occurrence of a second predefined event.

Various embodiments also provide line cards configured to be coupled to a communication bus in a modular unit. One line card comprises a processor including a system memory, the system memory storing a plurality of configuration tables. Each configuration table comprises a listing of processes to be transmitted to or received from the communication bus, wherein a first configuration table is selected from the plurality of configuration tables upon an occurrence of a predefined event.

Methods for forming a new system comprised of a first system including a first communication bus and a second system including a second communication bus are also provided. One method comprises the steps of connecting the first communication bus and the second communication bus to form a third communication bus for the new system and detecting the connection of the first communication bus and the second communication bus. The method further comprises the step of reconfiguring the first system and the second system to operate as the new system in response to detecting the connection.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
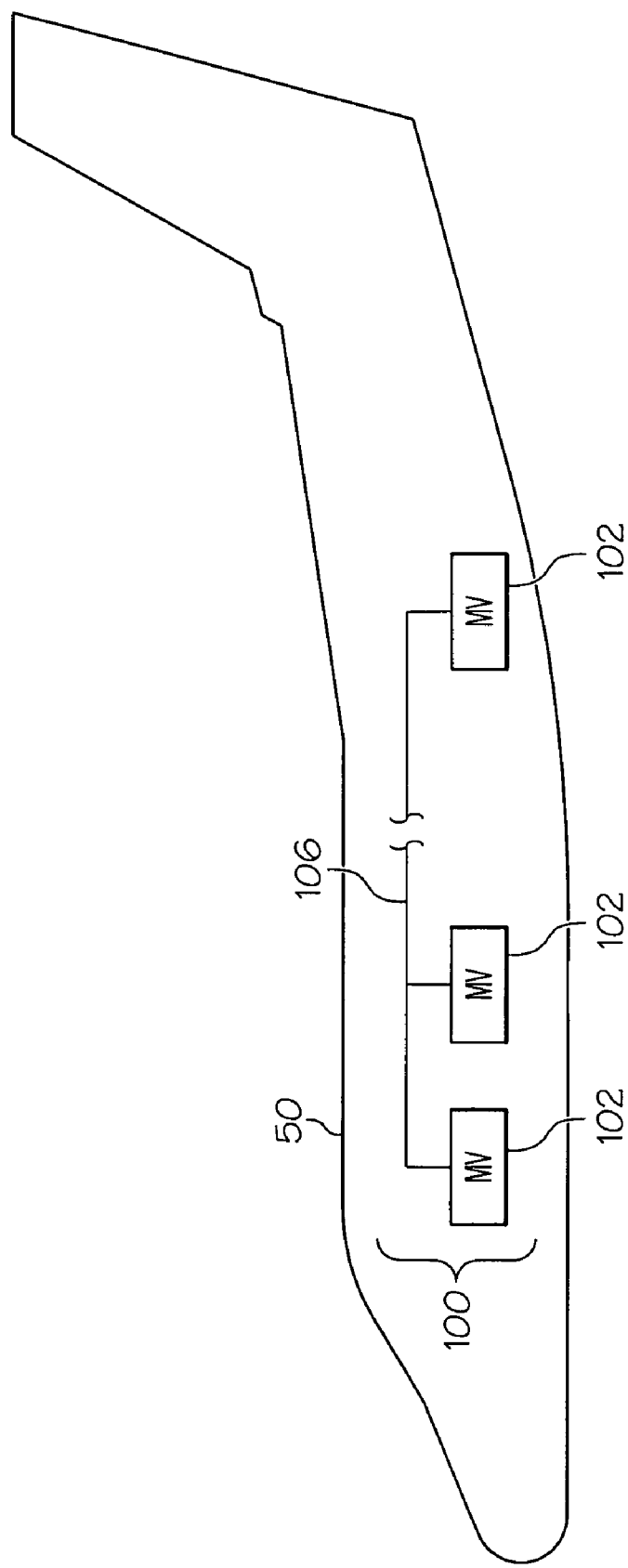
FIG. 1 is a diagram illustrating an aircraft comprising one embodiment of a virtual backplane system.

FIG. 1 illustrates one embodiment of a virtual backplane system 100 used in an aircraft 50; however, this embodiment could also be used in a spacecraft, a habitat, a robot, or like integrated control system. At least in the illustrated embodiment, aircraft 50 includes a computer network 104 comprising a plurality of modular units (MU) 102 coupled to one another via a system bus 106.

Each MU 102 is configured to support various processing and input/output (I/O) tasks. For example, a first MU 102 can be used to provide a collision avoidance system for aircraft 50, a second MU 102 can be used to provide a flight management system for aircraft 50, a third MU 102 can be used to provide a cockpit display system for aircraft 50, a fourth MU 102 can be used to provide an autopilot system for aircraft 50, and so on.

System bus 106 may be any system and/or device capable of allowing MUs 102 to communicate with one another. Furthermore, system bus 106 may be a wired and/or wireless bus. Wired buses may include both electrical buses and non-electrical buses that support the transfer of data, such as wire lines, optical fibers, and the like. Additionally, system bus, while shown in FIG. 1 as a single bus, system bus 106 may also include multiple redundant buses.

The communication occurring on system bus 106 is predetermined, but can be reconfigured during real-time operation by events within a MU 102 or by the addition of one or more MUs 102 on system bus 106 or the subtraction of one or more MUs 102 from system bus 106. In one embodiment, system bus 106 behaves as a reconfigurable virtual backplane connecting the individual MUs 102. In this embodiment, each MU 102 is capable of communicating with one another as if they were a single MU 102. That is, instead of one MU 102 sending a request for data over system bus 106 to another MU 102, data is placed on system bus 106 and retrieved from system bus 106 in a predetermined, deterministic manner, using, in one embodiment, configuration tables. In addition, the tasks performed by the MUs 102 can also be reconfigured dynamically during real-time operation based on the occurrence of an event, as will be discussed in greater detail below.

Figure 2:
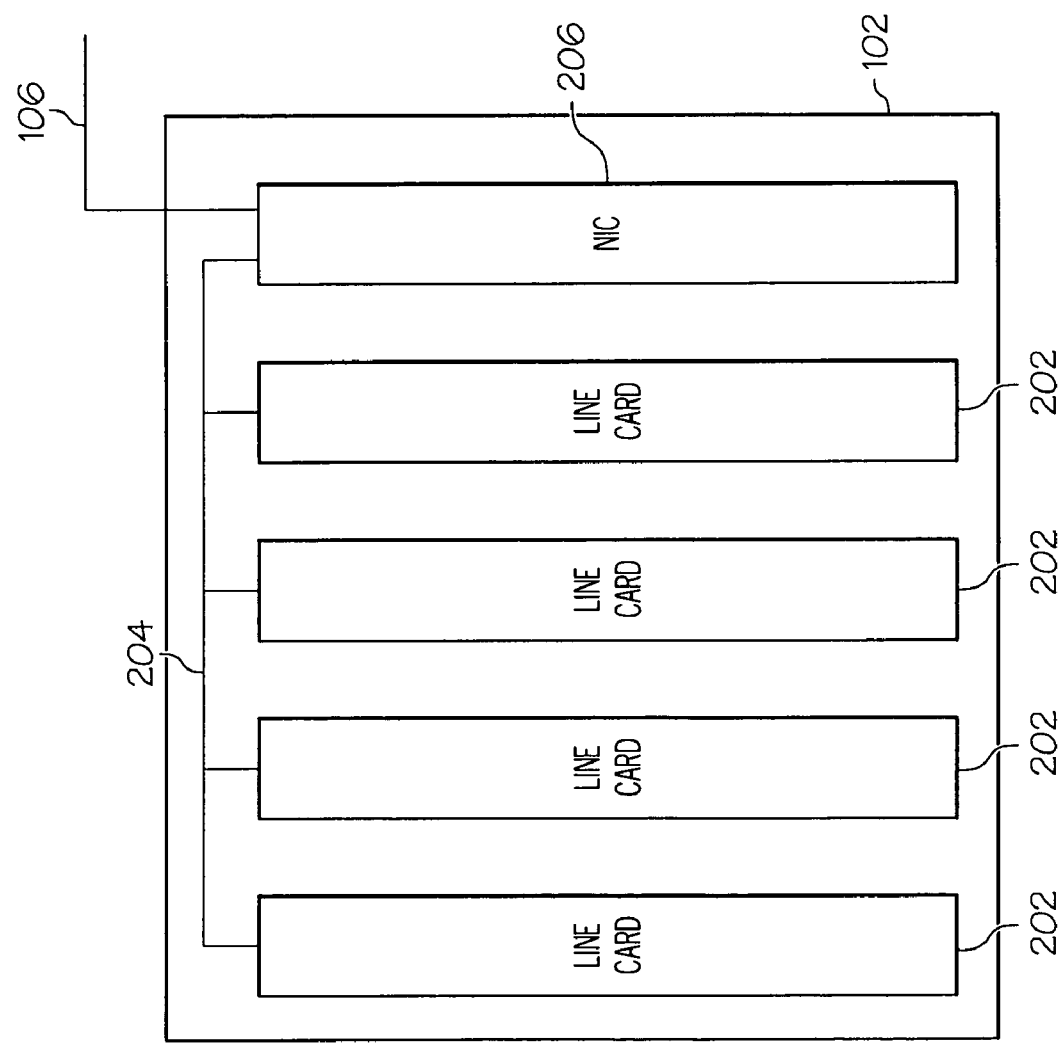
FIG. 2 illustrates one embodiment of a modular unit included within the virtual backplane system of FIG. 1.

FIG. 2 is a block diagram of an exemplary embodiment of a MU 102. MU 102 includes one or more line cards 202 coupled to one another via an internal backplane 204. MU 102 also includes a Network Interface Card (NIC) 206 coupled to the internal backplane 204 and to system bus 106.

In one embodiment, each line card 202 provides processing and I/O functions for MU 102, which may be loaded with software configured to perform particular tasks. For example, in an avionics embodiment, line cards 202 may be programmed to perform collision and/or terrain avoidance functions.

Backplane bus 204 provides a common communication connection between each line card 202 and NIC 206 in MU 102. Typically, line card 202 connects to backplane bus 204 via a physical insertion of the line card 202 into a slot (not shown) of the backplane bus 204. Alternatively, different ways of connecting line cards 202 to backplane bus 204 can be used including, for example, wired and/or wireless connections.

NIC 206 communicates with the reconfigurable virtual backplane system bus 106 by placing data on system bus 106 and retrieving data from system bus 106. As discussed above, NIC 206 also receives data from and sends data to line cards 202. In one exemplary embodiment, NIC 206 sends and receives data from data bus 106 at a predetermined schedule, which is described in greater detail below.

Figure 3:
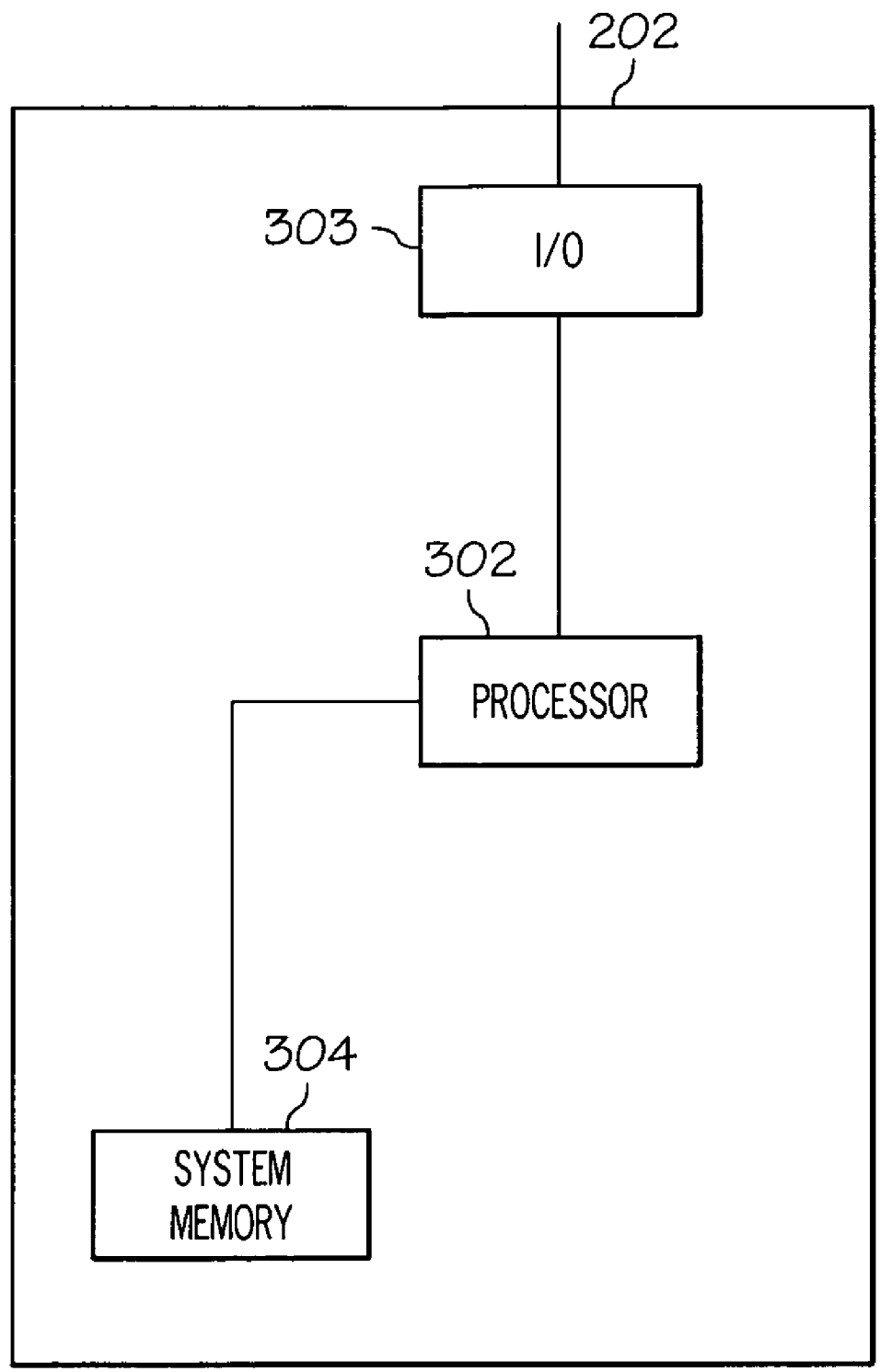
FIG. 3 illustrates an embodiment of a line card comprising a processor included within the modular unit of FIG. 2.

FIG. 3 is a block diagram of one embodiment of line card 202. Line card 202, at least in the illustrated embodiment, comprises a processor 302 coupled to a system memory 304, and optionally an input/output interface 303. As discussed above, line cards 202 can execute software programs to provide different functionalities.

Processor 302 may be any high integrity processor known in the art or developed in the future. In one embodiment processor 302 is configured to execute software assigned to run on line card 202. Although processor 302 is illustrated in FIG. 3 as a single processor, processor 302 can be deployed in any needed redundant configuration such as, but not limited to, a lock step or triple modular redundant processor configuration.

I/O interface 303 provides an input/output interface to backplane bus 204. Processor 302 is operable to indicate what data the I/O interface 303 should place on backplane bus 204, when to place the data on to backplane bus 204, and the rate at which to place the data on backplane bus 204. In addition, processor 302 is operable to instruct I/O interface 303 when to retrieve data from backplane bus 204 and what data to retrieve.

System memory 304 is configured to store data and program files that are executed using processor 302. System memory 304 is preferably a readable/writable memory that can be updated when needed. In one embodiment, multiple applications can be stored in system memory 304. The applications selected to be executed may be selected based on the occurrence of an event, as will be discussed in detail below.

Figure 4:
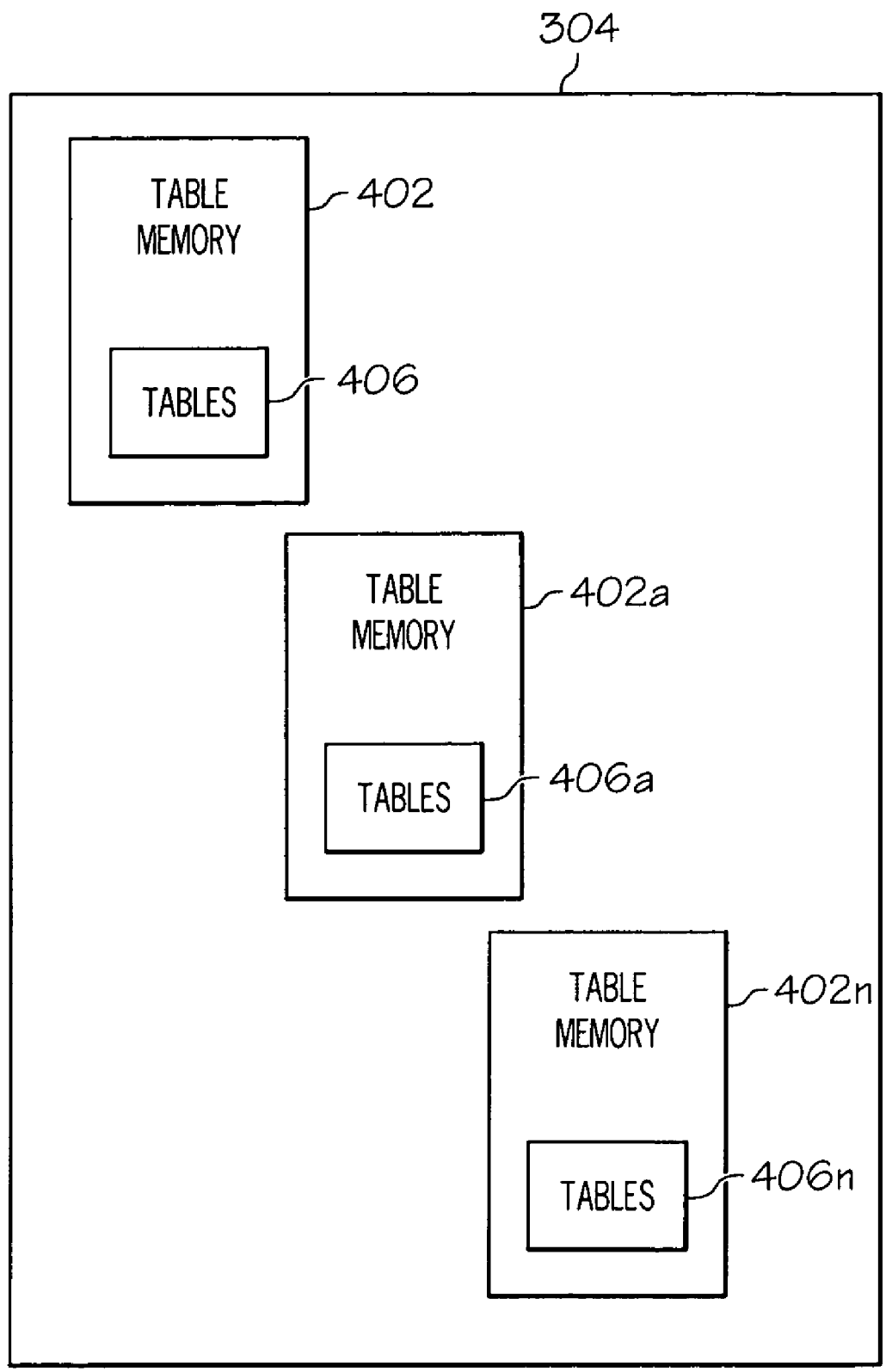
FIG. 4 is a block diagram of one embodiment of a system memory included within the processor of FIG. 3.

System memory 304 also comprises one or more table memories 402, as illustrated in FIG. 4. Each table memory 402 comprises a plurality of configuration tables 406. Configuration tables 406, in one embodiment, include information as to what programs and sequence of events that should be executed by processor 302 and what data is to be presented to and from virtual backplane system 100. In addition, configuration tables 406 may contain information as to what data needs to be placed or retrieved from backplane bus 204, when to place or retrieve the data and the rate at which the data is to be placed on or retrieved from backplane bus 204. The applications running on processor 302 use configuration tables 406 to determine the data retrieval and/or placement information.

System memory 304 associates each of configuration table 406 with the occurrence of one or more specific events. For example, a given line card 202 may be associated with one task until a certain amount of time has passed. When the time elapses or a predetermined event occurs, system memory 304 may be used to determine a new configuration table (e.g., configuration table 406a) to use. Configuration table 406a could then change what processor 302 is doing, such as by starting a new application and changing the information flow on virtual backplane system 100. Configuration table 406a may also change the data retrieved from and sent to the backplane bus 204.

In this exemplary embodiment, the use of configuration tables 406 allows data to be provided or sent in a predetermined, deterministic manner. The ability to change configuration tables 406 based on the occurrence of an event gives line card 202 the ability to be a reconfigurable line card.

In one exemplary embodiment, an event that can cause a change in the configuration tables may include a change in the number of line cards 202 operating at any given time. The change in the number of operating line cards 202 may include the failure or loss of a line card 202. If a line card 202 malfunctions, a new configuration table 406 can be used to instruct another line card 202 to take over for the failed line card 202. Additionally, the change in the number of line cards 202 may include the addition of a line card 202 to a particular MU 102. The addition of a line card 202 may result in a new configuration table 406 that has the new line card 202 takeover some process functions from one or more other line cards 202. A change in the number of operating line cards 202 also includes the situation where there is the same number of failed line cards 202 as there are new line cards 202.

In another embodiment, an event that can cause a change in configuration tables 406 is a change in software functionality. A change in software functionality may include the loss of software functionality or the addition of a software functionality.

Various embodiments contemplate that additional configuration tables may be provided as needed. For example, if an event occurs that does not have a configuration table 406, an appropriate new configuration table 406 can be generated. In one embodiment, the new configuration table 406 can be generated by virtual backplane system 100. In an alternate embodiment, the new configuration table 406 can be generated by a third party and provided to virtual backplane system 100. For example, if virtual backplane system 100 is deployed in a spacecraft, ground control could provide the new configuration table 406 to virtual backplane system 100.

In the embodiments shown in FIGS. 2-4, backplane bus 204 couples each line card 202 within a MU 102 to one another. In another exemplary embodiment, a plurality of MUs 102 may be coupled to one another via a virtual back plane connection.

Figure 5:
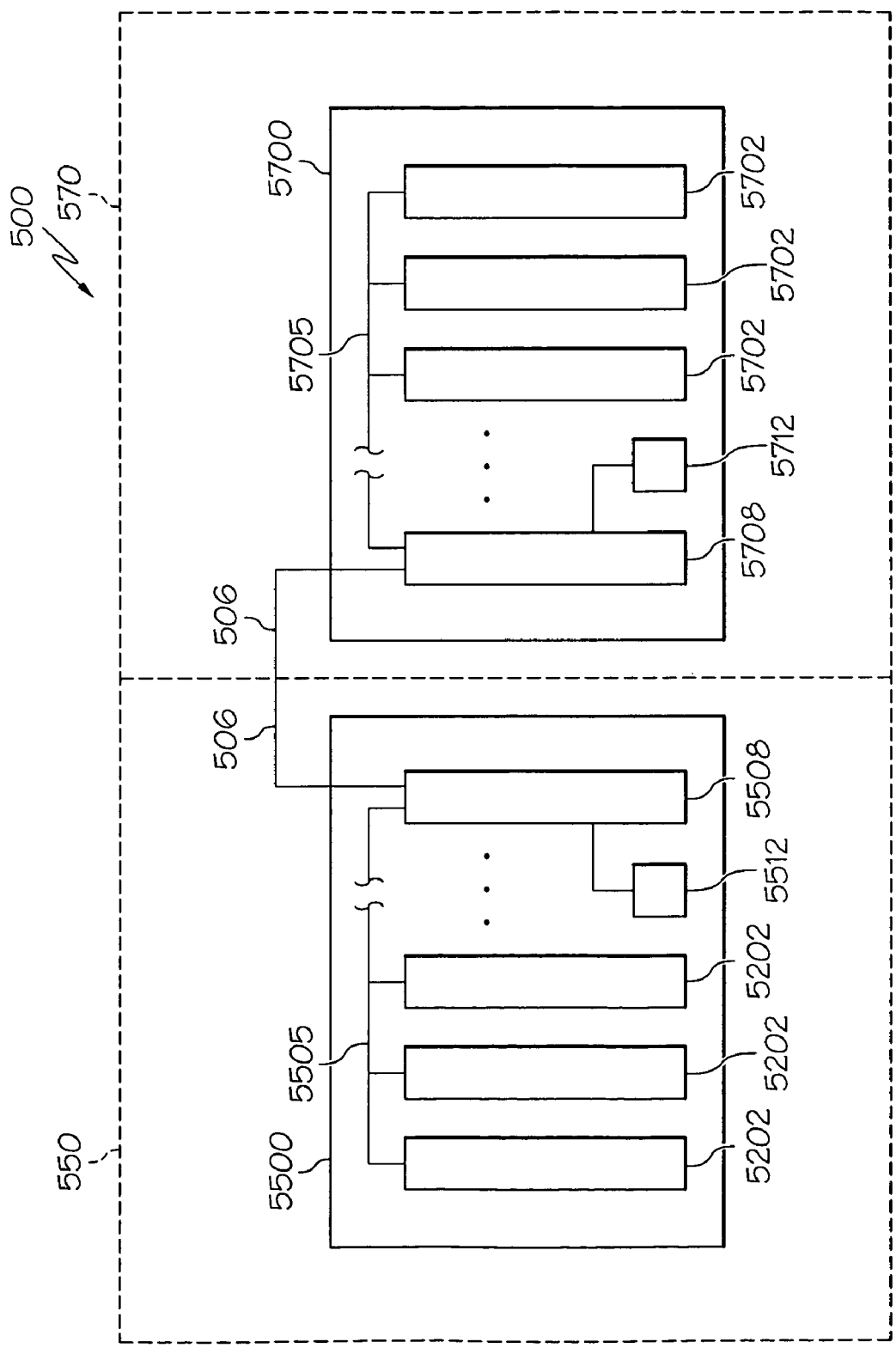
FIG. 5 is a block diagram illustrating a plurality of modular units coupled to one another in accordance with various embodiments of the present invention.

FIG. 5 is a block diagram illustrating a plurality of MUs 102 coupled to one another to form a new system 500. For example, system 500 may be formed from the connection of a first spacecraft 550 (e.g., a lunar module) and a second spacecraft (e.g., a lunar orbiter) 570. Specifically, system 500 is formed when a MU 5500 in spacecraft 550 and a MU 5700 in spacecraft 570 become connected by a common system bus 506, which can act as a configurable, virtual backplane bus.

In the embodiment illustrated in FIG. 5, MUs 5500 and 5700 each comprise one or more line cards 5502 and 5702, respectively. Lines cards 5502 and 5702 are each coupled to one another via an internal backplane 5505 or 5705, respectively. MUs 5500 and 5700 each also comprise a bridge connector 5508 and 5708, respectively, coupled to their respective internal backplanes 5505 and 5705.

Bridge connectors 5508 and 5708 each serve as a network interface card connecting MUs 5502 and 5702 to system bus 506. Bridge connectors 5508 and 5708, in one embodiment, each include a bridge configuration memory 5512 and 5712, respectively, that include a table memory comprising a plurality of configuration tables within a system memory. As discussed above, each configuration table provides the application running on the bridge connector with information regarding what data to place on or receive from system bus 506, when to place or receive the data, and at what rate the data is placed on or received from system bus 506.

In one exemplary embodiment, line cards 5202 and 5702 each include a system memory similar to system memory 304 discussed above with reference to FIG. 3. In this embodiment, backplane buses 5505, 5705 and system bus 506 act as configurable, virtual backplanes. In this manner, the occurrence of an event could change the way any of line cards 5202 and/or 5702, and/or bridge connectors 5508 and/or 5708 operate.

In another exemplary embodiment, line cards 5502 and 5702 are commercially available line cards and backplane buses 5505 and 5705 serve to couple their respective line cards in a conventional fashion. For example, backplane buses 5505 and 5705 may each be a peripheral component interconnect (PCI) bus. In this embodiment, bridge connectors 5508 and 5708 allow MUs 5500 and 5700 to be connected using a reconfigurable virtual backplane.

Figure 6:
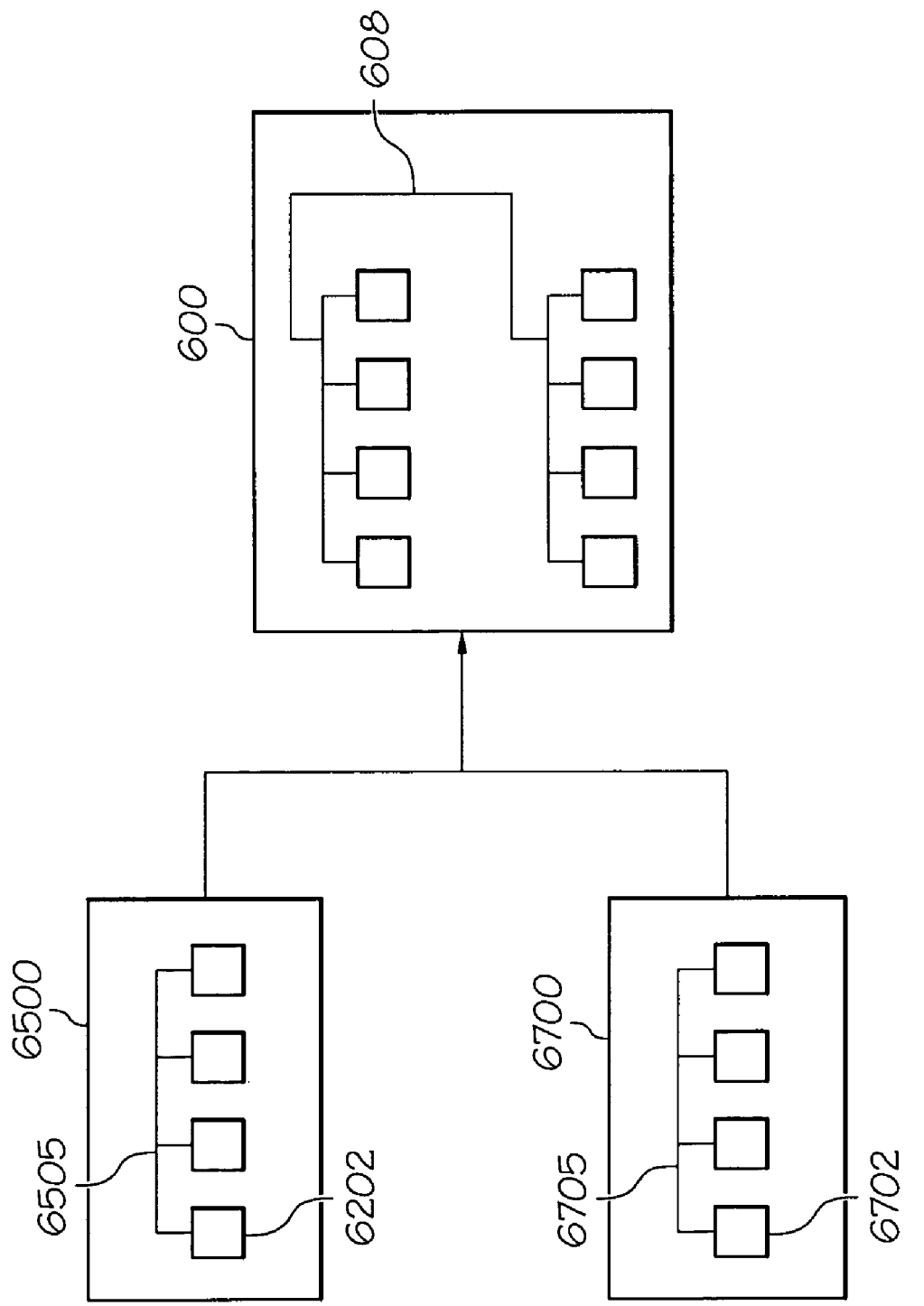
FIG. 6 is a block diagram illustrating one embodiment of two systems being combined to form a single system including a virtual backplane.

The exemplary embodiments discussed previously have dealt with either a reconfigurable virtual back plane coupling individual line cards in a MU or MUs coupled by a virtual backplane (whether or not the line cards within the MUs are coupled by a virtual backplane). Another exemplary embodiment of the present invention is illustrated in FIG. 6, which shows two different systems, a first system 6500 and a second system 6700, from different networks forming a new system 600.

At least in the illustrated embodiment, system 600 couples MUs 6500 and 6700 to each other by a virtual backplane 6505 within MU 6500 and a virtual backplane 6705 within MU 6700. Systems 6500 and 6700, when separated, can each perform different functions. For example, system 6500 can be a space vehicle that at launch includes the crew, while the second system 6700 can be a lunar landing vehicle that is launched separate from system 6500. At some point in time, the space vehicle and the lunar landing vehicle will dock, which will allow the crew access to the lunar landing vehicle. When system 6500 and system 6700 connect to form system 600, the virtual backplanes 6505 and 6705 are combined to form a combined virtual backplane 608. In one embodiment, the virtual backplanes 6505 and 6705 are physically coupled upon the docking of systems 6500 and 6700. Alternatively, the virtual backplanes 6505 and 6705 can be coupled by a wireless link that does not require exact physical coupling of the backplanes 6505 and 6705.

The connection of systems 6500 and 6700 is an occurrence that, when detected, can trigger a reconfiguration of one or more subsystems on systems 6500 and/or 6700. For example, detection of the connection of systems 6500 and 6700 can trigger changes to current configurations, such as activating the air conditioning and/or other systems in the lunar module, while altering the flight computer of system 6500 to compensate for the additional mass of the combined systems. While FIG. 6 illustrates the connection of systems 6500 and 6700, detection of the disconnection of systems 6500 and 6700 can also initiate configuration changes according to a system memory and associated configuration memories included in line cards 6202 and 6702 stored in systems 6500 and 6700, respectively, which are similar to line cards 202 discussed above with reference to FIG. 2. For example, when systems 6500 and 6700 disconnect, the air conditioning and/or other systems in the lunar module may return to their operational states prior to connection of systems 6500 and 6700. Likewise, the flight computer of system 6500 will reconfigure to no longer compensate for the additional mass. In other words, the flight computer will return to its operational state prior to connection of systems 6500 and 6700.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A reconfigurable virtual backplane system, comprising:
a communication bus;
a first line card coupled to the communication bus, the first line card including a first processor comprising a first system memory, the first system memory storing a first array of configuration tables, each of the first configuration tables storing a listing of processes to be transmitted to or received from the communication bus, wherein a first configuration table is selected from the first array of configuration tables upon an occurrence of a first predefined event; and
a second line card coupled to the communication bus, the second line card including a second processor comprising a second system memory, the second system memory storing a second array of configuration tables, each of the second configuration tables storing a listing of processes to be transmitted to or received from the communication bus, wherein a second configuration table is selected from the second array of configuration tables upon an occurrence of a second predefined event.

2. The reconfigurable virtual backplane system of claim 1, wherein the first predefined event or the second predefined event is a passage of an amount of time.

3. The reconfigurable virtual backplane system of claim 1, wherein the first predefined event or the second predefined event is a change in the number of line cards.

4. The reconfigurable virtual backplane system of claim 1, wherein the first predefined event or the second predefined event is a change in a software function.

5. The reconfigurable virtual backplane system of claim 1, wherein additional tables can be added to the first and second array of tables, wherein each additional table is associated with a new predefined event.

6. The reconfigurable virtual backplane system of claim 1, wherein the communication bus is, at least partially, a wireless communication bus.

7. The reconfigurable virtual backplane system of claim 1, wherein at least one of the line cards is in a first network comprising a first reconfigurable, virtual backplane and at least one of the line cards is in a second network comprising a second reconfigurable, virtual backplane, the first network and second network combinable to form a third network comprising a third reconfigurable, virtual backplane.

8. A line card configured to be coupled to a communication bus in a modular unit, comprising:
a processor comprising a system memory, the system memory storing a plurality of configuration tables, each configuration table comprising a listing of processes to be transmitted to or received from the communication bus, wherein a first configuration table is selected from the plurality of configuration tables upon an occurrence of a predefined event.

9. The line card of claim 8, wherein the system memory is configurable to add additional configuration tables or subtract configuration tables.

10. The line card of claim 8, further comprising an input/output interface coupling the line card to the communication bus.

11. The line card of claim 10, wherein the communication bus is a bus internal to the modular unit.

12. The line card of claim 10, wherein the communication bus is configured to connect the modular unit to another modular unit.

13. A method for forming a new system comprised of a first system including a first communication bus and a second system including a second communication bus, comprising the steps of:
connecting the first communication bus and the second communication bus to form a third communication bus for the new system comprising one or more bridge connectors further comprising a system memory, the system memory storing an array of configuration tables, each of the first configuration tables storing a listing of processes to be transmitted to or received from the communication bus;
detecting the connection of the first communication bus and the second communication bus;
reconfiguring the first system and the second system to operate as the new system in response to detecting the connection.

14. The method of claim 13, further comprising the steps of:
disconnecting the first communication bus and the second communication bus;
detecting disconnection of the first communication bus and the second communication bus;
reconfiguring the first system to operate as the first system in response to the disconnection; and
reconfiguring the second system to operate as the second system in response to the disconnection.

15. The method of claim 13, wherein the first system is a first spacecraft and the second system is a second spacecraft.

* * * * *